(12) United States Patent
Franconi et al.

(10) Patent No.: US 6,910,851 B2
(45) Date of Patent: Jun. 28, 2005

(54) TURBOFAN JET ENGINE HAVING A TURBINE CASE COOLING VALVE

(75) Inventors: Robert B. Franconi, New Hartford, CT (US); Robert B. Goodman, West Hartford, CT (US); Scott R. MacDonald, East Hampton, CT (US); Paul Mazzone, Bristol, CT (US)

(73) Assignee: Honeywell International, Inc., Morristown, NJ (US)

( * ) Notice: Subject to any disclaimer, the term of this patent is extended or adjusted under 35 U.S.C. 154(b) by 51 days.

(21) Appl. No.: 10/452,571

(22) Filed: May 30, 2003

(65) Prior Publication Data

US 2004/0240988 A1 Dec. 2, 2004

(51) Int. Cl.⁷ .................................................. F01D 5/14
(52) U.S. Cl. ........................ 415/115; 415/116; 415/144
(58) Field of Search ................................ 415/144, 145, 415/115, 116

(56) References Cited

U.S. PATENT DOCUMENTS

| | | |
|---|---|---|
| 2,970,806 A | 2/1961 | Rexford et al. |
| 3,015,935 A | 1/1962 | Evans |
| 3,570,541 A | 3/1971 | Franz et al. |
| 3,773,085 A | 11/1973 | Caldwell, Jr. |
| 4,033,119 A * | 7/1977 | Nichols ..................... 60/226.3 |
| 4,269,227 A | 5/1981 | Araki et al. |
| 4,296,599 A | 10/1981 | Adamson |
| 4,329,114 A * | 5/1982 | Johnston et al. ............. 415/145 |
| 4,462,204 A | 7/1984 | Hull |
| 4,527,385 A | 7/1985 | Jumelle et al. |
| 4,719,943 A | 1/1988 | Perach |
| 4,849,895 A | 7/1989 | Kervistin |
| 4,928,240 A * | 5/1990 | Davison et al. ............. 701/100 |
| 4,966,193 A | 10/1990 | De Campos |
| 4,986,309 A | 1/1991 | Bellanca |
| 5,048,288 A | 9/1991 | Bessette et al. |
| 5,062,452 A | 11/1991 | Johnson |
| 5,113,649 A | 5/1992 | Siedlecki, Jr. |
| 5,156,181 A | 10/1992 | Maalouf et al. |
| 5,305,616 A | 4/1994 | Coffinberry |
| 5,351,732 A | 10/1994 | Mills et al. |
| 5,485,717 A | 1/1996 | Williams |
| 5,687,563 A | 11/1997 | Thompson, Jr. |
| 5,993,149 A | 11/1999 | Smed |

FOREIGN PATENT DOCUMENTS

GB          1 581 566        12/1980
WO  PCT/US2004/016488        9/2004

* cited by examiner

*Primary Examiner*—Hoang Nguyen
(74) *Attorney, Agent, or Firm*—Ingrassia Fisher & Lorenz

(57) ABSTRACT

A turbofan jet engine that includes a valve assembly mounted within the engine and in fluid communication with the engine bypass flow passage. The valve assembly includes a valve body that has a fluid inlet port in fluid communication with the bypass flow passage, and two or more fluid outlet ports in fluid communication with two different turbine case sections. The valve is disposed in the valve body and is selectively moveable between a closed position and an open position. In the close position only one fluid outlet port is in substantial fluid communication with the fluid inlet port, to thereby supply cooling air to one turbine case section. In the open position, all of the fluid outlet ports are in substantial fluid communication with the fluid inlet port, to thereby supply cooling air to all of the turbine case sections.

31 Claims, 5 Drawing Sheets

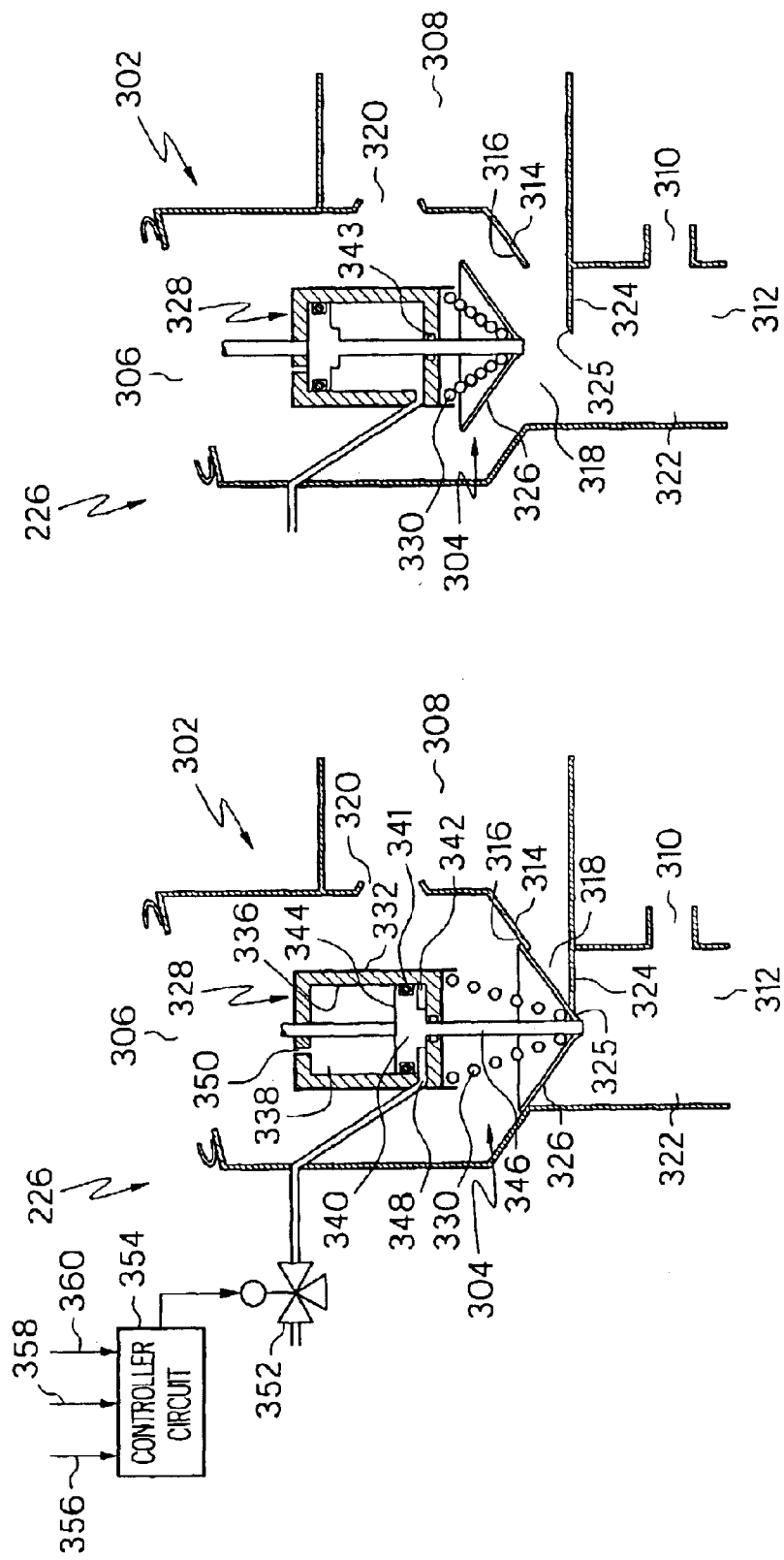

TURBOFAN JET ENGINE HAVING A TURBINE CASE COOLING VALVE

FIELD OF THE INVENTION

The present invention relates to multi-spool gas turbine jet engines and, more particularly, to a multi-spool gas turbine jet engine that includes a valve used to selectively distribute cooling air flow to the engine turbine case.

BACKGROUND OF THE INVENTION

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors. For example, in a triple spool engine, the compressor section may include a high pressure compressor, and an intermediate compressor. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is exhausted from the engine via the exhaust section, and the energy remaining in this exhaust air aids the thrust generated by the air flowing through the bypass plenum.

Similar to the compressor section, in a multi-spool (e.g., multi-shaft) engine the turbine section may include a plurality of turbines. For example, in a triple spool engine, the turbine section may include a high pressure turbine, an intermediate pressure turbine, and a low pressure turbine. The energy generated in each of the turbines may be used to power other portions of the engine. For example, the low pressure turbine may be used to power the fan via one spool, the intermediate turbine may be used to power the intermediate pressure turbine via another spool that is concentric to the low pressure turbine spool, and the high pressure turbine may be used to power the high pressure compressor via yet another concentric spool.

Typically, each turbine in a multi-spool gas turbine engine is mounted within a turbine case. The rotationally mounted rotor blades in each turbine extend radially from its associated spool, and are surrounded by, and spaced apart from, an annular seal that is attached to the turbine case. The radial clearance between the turbine blade ends and the annular seal is preferably minimized, in order to reduce leakage of fluid (e.g., air) past the rotor blades. This is because turbine efficiency decreases as fluid leakage past the turbine blades increases.

During a typical gas turbine engine operating cycle, rotational speed and temperature variations within the turbine may result in variations of the radial clearance between the blades and the annular seal. Hence, to avoid contact between the blades and annular seal, the clearance between these components may, under some circumstances, be larger than would otherwise be desirable for certain engine operating conditions. The condition which results in the smallest radial clearance between the blades and annular seal occurs when the gas turbine engine is quickly brought up to full power. This may occur, for example, during an aircraft take-off and climb to cruise altitude. During an aircraft take-off, the turbine blades heat up rapidly and thermally expand. Additionally, the turbine's rotational speed increases, subjecting the blades to centrifugal forces that may cause radial blade growth. At the same time, the annular seal, and the turbine case that supports it, may both heat up rapidly and thermally expand.

After take-off and climb to cruise altitude, when the gas turbine engine is operated in a lower power condition, a temperature equilibrium situation may be reached in the engine. However, the equilibrium temperature reached in various components of the turbines may result in the radial clearance between the turbine blades and annular seal being larger than desirable, resulting in undesirable leakage and concomitantly low engine efficiency.

The rate at which the turbine case and turbine blades thermally expand are preferably matched so that the rotor blade/annular seal radial clearance remains within minimal clearance limits. Attempts have been made to overcome the problem of variation in the radial gap between the sealing member and the blades by providing various turbine case cooling systems and schemes. One system uses a plurality of individual flapper valves that are disposed between the engine bypass section and the turbine case. Although safe and generally effective, this system suffers certain drawbacks. For example, because a plurality of valves are used, engine weight, complexity, maintenance, and cost are increased. In addition, controlling the position of more than one valve can increase control complexities.

Hence, there is a need for a turbine case cooling valve arrangement that addresses one or more of the above-noted drawbacks. Namely, a valve that can cool plural sections of a gas turbine engine turbine case that does not increase engine weight, and/or complexity, and/or cost, relative to known valves, and/or that is less complex to control than known valve configurations. The present invention addresses one or more of these needs.

SUMMARY OF THE INVENTION

The present invention provides a valve that may be installed in a turbofan gas turbine engine to selectively supply cooling air flow to one or more sections of the engine's turbine case.

In one embodiment, and by way of example only, a turbofan jet engine includes a turbine, a fan case, and a valve assembly. The turbine case includes at least a high pressure turbine section and a low pressure turbine section. The fan case is disposed around at least a portion of the turbine case and is spaced apart therefrom to form a bypass flow passage. The valve assembly is mounted in the engine and includes a valve body and a valve. The valve body has at least a fluid inlet port in fluid communication with the bypass flow passage, a first fluid outlet port in fluid communication with the low pressure turbine case section, and a second fluid outlet port in fluid communication with the high pressure turbine case section. The valve is disposed in the valve body and is selectively moveable between (i) a closed position, in which only the first fluid outlet port is in substantial fluid communication with the fluid inlet port to thereby supply cooling air to the low pressure turbine case section, and (ii) an open position, in which the first fluid outlet port and the second fluid outlet port are both in substantial fluid communication with the fluid inlet port to thereby supply cooling air to the low pressure turbine case section and the high pressure turbine case section.

In another exemplary embodiment, a valve assembly for selectively distributing cooling air flow to multiple sections of a turbofan jet engine turbine case includes a valve body and a valve. The valve body has at least a fluid inlet port in fluid communication with the bypass flow passage, a first fluid outlet port in fluid communication with the low pressure turbine case section, and a second fluid outlet port in fluid communication with the high pressure turbine case section. The valve is disposed in the valve body and is selectively moveable between (i) a closed position, in which only the first fluid outlet port is in substantial fluid communication with the fluid inlet port to thereby supply cooling air to the low pressure turbine case section, and (ii) an open position, in which the first fluid outlet port and the second fluid outlet port are both in substantial fluid communication with the fluid inlet port to thereby supply cooling air to the low pressure turbine case section and the high pressure turbine case section.

In still another exemplary embodiment, a valve actuator for moving a turbine case cooling valve between an open and a closed position includes a main body and a piston. The main body is adapted to mount within the turbine case cooling valve, and includes an inner bearing surface that defines an inner volume. The piston is movably mounted within the main body inner volume against the inner bearing surface, and is adapted to couple to the turbine case cooling valve.

Other independent features and advantages of the preferred engine and turbine case cooling valve will become apparent from the following detailed description, taken in conjunction with the accompanying drawings which illustrate, by way of example, the principles of the invention.

BRIEF DESCRIPTION OF THE DRAWINGS

FIGS. 3 and 4 are schematic representations of an exemplary embodiment of a turbine case cooling valve assembly used in the engine of FIG. 1 with the valve in the closed and open positions, respectively.

DETAILED DESCRIPTION OF A PREFERRED EMBODIMENT

Figure 1:
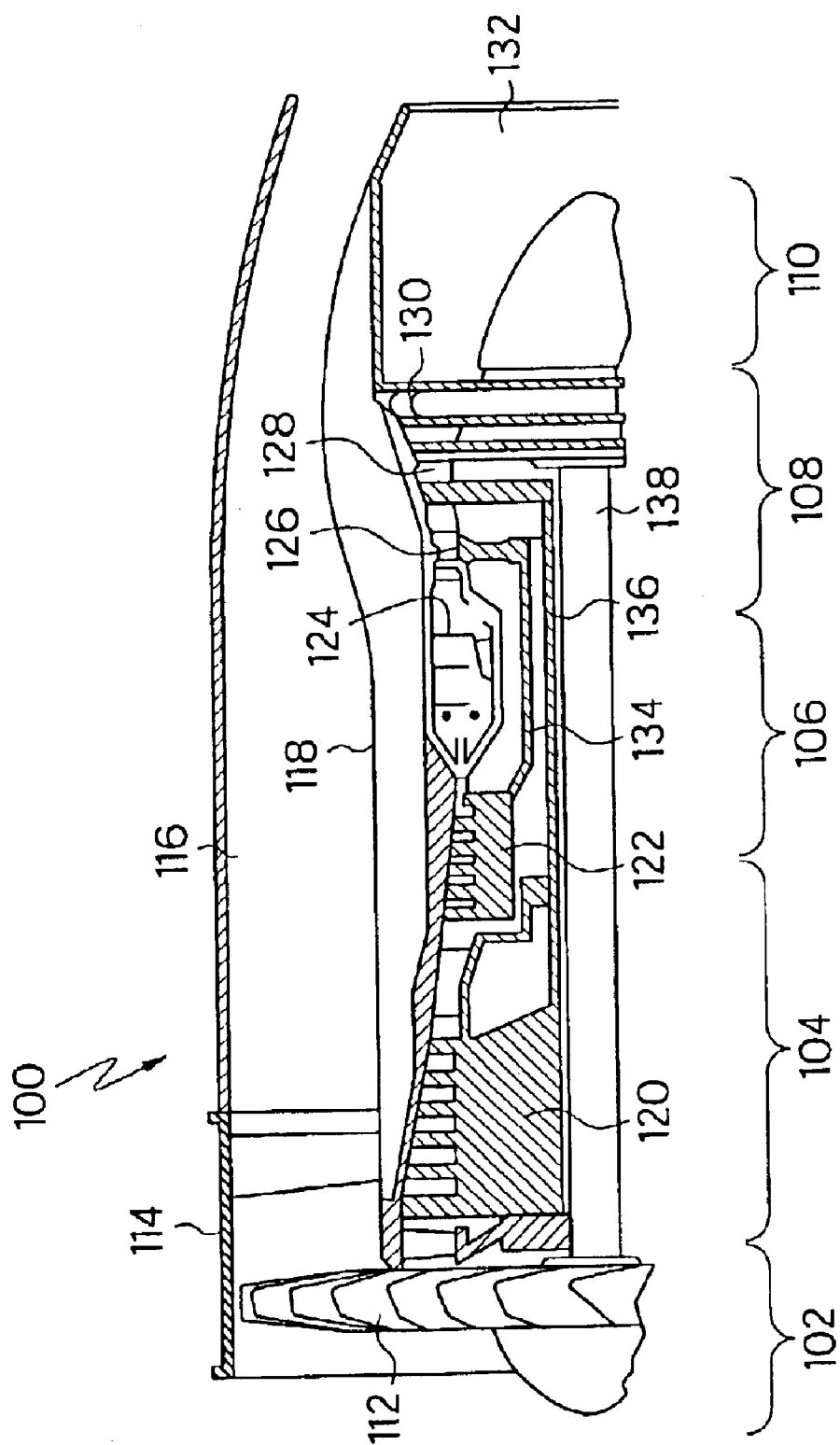
FIG. 1 is a cross section side view of a portion of an exemplary gas turbine engine according to an embodiment of the present invention.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a plurality of combustors 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 130 drives the intermediate pressure compressor 120 via an intermediate pressure spool 136, and the low pressure turbine 130 drives the fan 112 via a low pressure spool 138.

Figure 2:
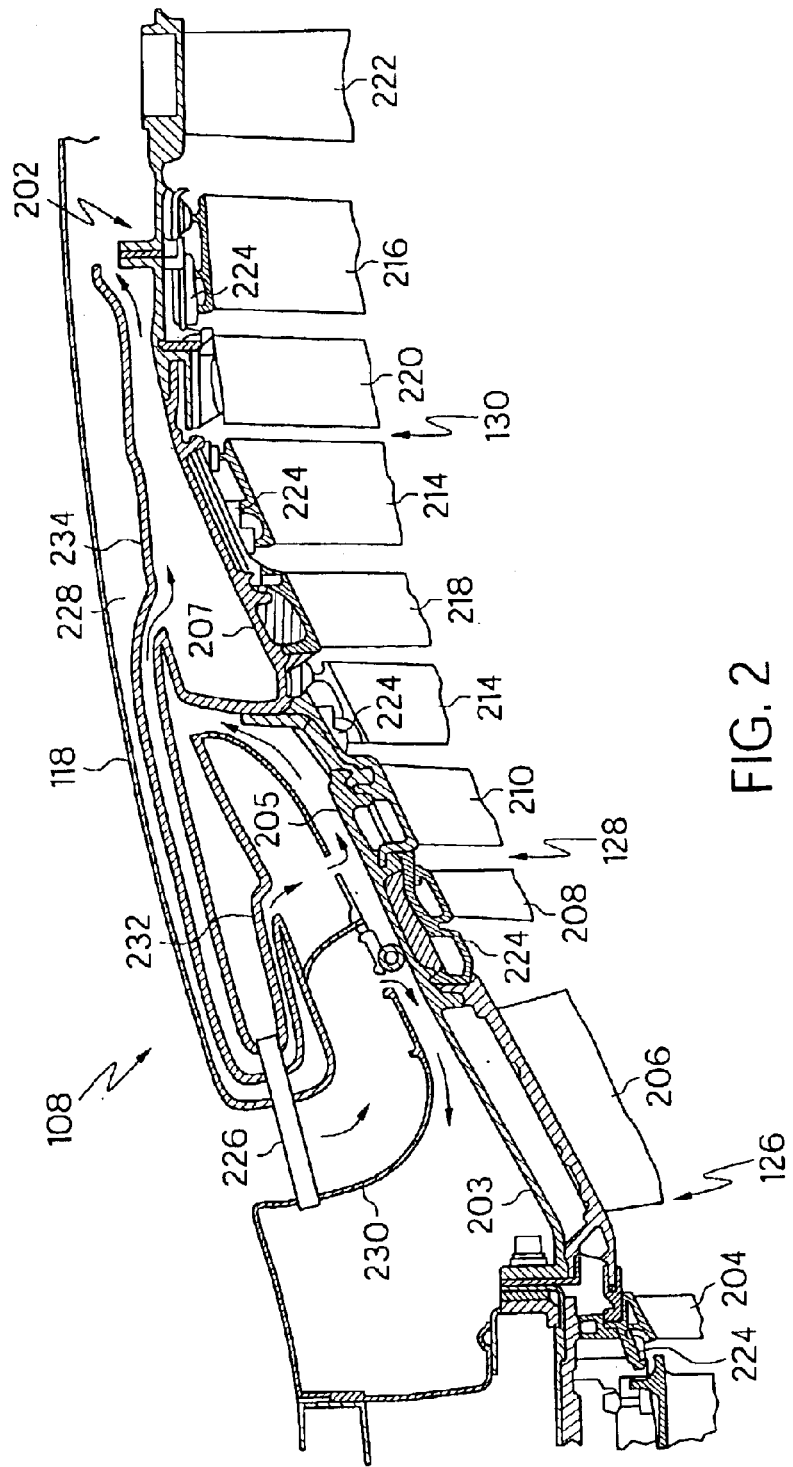
FIG. 2 is a cross section side view of a portion of the turbine section of the engine shown in FIG. 1.

Turning now to FIG. 2, which shows the turbine section 108 of the engine 100 in more detail, it is seen that the high pressure 126, intermediate pressure 128, and low pressure turbines 130 are each mounted within a turbine case 202, which includes a high pressure section 203, an intermediate pressure section 205, and a low pressure section 207. Each of the turbines 126, 128, 130 includes one or more sets of moveable rotor blades and one or more sets of fixed stator blades. In the depicted embodiment, the high pressure turbine 126 includes one set of moveable rotor blades 204 (only one blade shown) and one set of fixed stator blades 206 (only one blade shown). Similarly, the intermediate pressure turbine 128 includes one set of moveable rotor blades 208 and one set of fixed stator blades 210. The low pressure turbine 130, however, includes three sets of moveable rotor blades 212, 214, 216, and three sets of fixed stator blades 218, 220, 222. It will be appreciated that, for clarity, only a single blade in each set of rotor and stator blades is shown in FIG. 2.

The stator blades 206, 210, 218, 220, 220 are each coupled to an inner surface of the turbine case 202 and, while not depicted in FIG. 2, the rotor blades 204, 208, 212, 214, 216 are each coupled to the respective high pressure, intermediate pressure, and low pressure spools 134, 136, 138. A plurality of annular seals 224 are also coupled to the inner surface of each turbine case section 203, 205, 207. The annular seals 224 are each disposed radially outwardly of, and spaced apart from, each set of rotor blades 204, 208, 212, 214, 216, to form a radial gap between each of the seals 224 and each of the rotor blades 204, 208, 212, 214, 216.

As was noted above, during operation of the engine 100, the turbine case 202 thermally expands and contracts. This expansion and contraction, coupled with variations in turbine speed, result in variations in the gaps between the annular seals 224 the rotor blades 204, 208, 212, 214, 216. As was additionally noted above, the gap sizes and variations in gap sizes are preferably minimized to reduce fluid leakage past the rotor blades 204, 208, 212, 214, 216. In order to minimize the variations in gap size, the turbine case 202 is selectively cooled by selectively directing cooling air onto the various sections 203, 205, 207 of the turbine case. In the depicted embodiment, a valve assembly 226 is used to implement this function. The valve assembly 226, which is shown in block diagram form in FIG. 2, is coupled to the engine cowl 118, and is positioned in an annular space 228 formed between the engine cowl 118 and the turbine case 202. A plurality of manifolds, which includes a high pressure manifold 230, an intermediate pressure manifold 232, and a low pressure manifold 234, are also disposed within the annular space 228, and are used to direct cooling air that flows through the valve assembly 226 to the high pressure, intermediate pressure, and low pressure turbine case sections 203, 205, 207, respectively. With reference now to FIGS. 3–6, a detailed description of a particular preferred embodiment of the valve assembly 226 and its operation will be provided.

Turning first to FIGS. 3 and 4, which are schematic representations of the valve assembly 226 in its open and closed positions, respectively, it is seen that the valve assembly 226 includes a valve body 302 and a flow control valve 304 mounted within the body 302. The valve body 302 includes a fluid inlet port 306 and three fluid outlet ports, a low pressure turbine outlet port 308, an intermediate pressure turbine outlet port 310, and a high pressure turbine outlet port 312. The flow control valve 304 is mounted in the valve body 302 between the fluid inlet port 306 and the three fluid outlet ports 308–310, and is moveable between a closed position and an open position. The valve body 302 and flow control valve 304 are configured such that when the flow control valve 304 is in its closed position (FIG. 3) the fluid inlet port 306 is in fluid communication with the low pressure turbine outlet port 308, and is fluidly isolated from both the intermediate pressure turbine outlet port 310 and the high pressure turbine outlet port 312. Conversely, when the flow control valve 304 is in its open position (FIG. 4), the fluid inlet port 306 is in fluid communication with all three of the outlet ports 308–312.

To provide the above-described fluid communication through the valve assembly 226, the valve body 302 additionally includes a flow control wall 314. The flow control wall 314 is disposed within the valve body 302 between the fluid inlet port 306 and the three outlet ports 308, 310, 312, and includes a valve seat surface 316 against which the flow control valve 304 seats when it is closed. The valve seat surface 316 defines a main flow aperture 318 through the flow control wall 314. The main flow aperture 318 is in fluid communication with all three of the fluid outlet ports 308, 310, 312, and fluidly communicates the fluid inlet port 306 with all three of the fluid outlet ports 308, 310, 312 when the flow control valve 304 is open.

The flow control wall 314 also includes one or more flow orifices 320. The flow orifices 320 extend through the control wall 314 to provide fluid communication between the fluid inlet port 306 and the low pressure turbine outlet port 310 when the flow control valve 304 is either open or closed. The flow orifices 320 are preferably configured so that the flow rate of fluid through the low pressure turbine outlet port 308 is reduced, as compared to the flow rate that exists when the flow control valve 304 is open.

As FIGS. 3 and 4 also show, the intermediate and high pressure turbine outlet ports 310, 312 are in continuous fluid communication with one another via a common intermediate/high pressure plenum 322, which is disposed in the valve body 302 downstream of the valve 304 and flow control wall 314. However, the intermediate and high pressure turbine outlet ports 310, 312 are only in fluid communication with the low pressure turbine outlet port 308 when the flow control valve 304 is in its open position. This is because the valve body 302 also includes a flow isolation baffle 324, which is disposed between the low pressure turbine outlet port 308 and the intermediate/high pressure plenum 322. The flow isolation baffle 324 includes a valve restriction surface 325 that is positioned proximate the main flow aperture 318 in the flow control wall 314. As shown in FIG. 3, when the flow control valve 304 is in its closed position, it not only seats against the valve seat surface 316, it is at least in close proximity to the flow isolation baffle valve restriction surface 325. Thus, when the flow control valve 304 is in the closed position, even though fluid may flow through the flow orifices 320 and out the low pressure turbine outlet port 308, the flow isolation baffle 324 substantially inhibits fluid flow through to the intermediate/high pressure plenum 322. It will be appreciated that the flow control valve 304 could contact the valve restriction surface 325 when in its closed position, rather move into close proximity.

The flow control valve 304 may be any one of numerous types of valves now known, or developed in the future. In the depicted embodiment, the flow control valve 304 is a poppet 326. It will additionally be appreciated that any one of numerous control devices and methods may be used to move the flow control valve 304 between the open and closed positions. In the depicted embodiment, a fluid-operated actuator 328 and spring 330 are used. The actuator 328 includes a main body 332 that is mounted within the valve body 302. The main body 334 has an inner bearing surface 336 that defines an inner volume 338 that is preferably cylindrical in shape. A piston 340 is movably mounted within the main body inner volume 338, and a seal 341 is placed around at least a portion of an outer peripheral surface of the piston 340 so that the main body inner volume 338 on a first side 342 of the piston 340 is substantially fluidly sealed from the main body inner volume 338 on a second side 344 of the piston 340.

The spring 330 is disposed between the actuator main body 328 and the poppet 326, and is configured to bias the poppet 326 toward the closed position. A valve operator 346 is coupled to the piston 340 and the poppet 326. Thus, movement of the piston 340 upward and downward (with respect to the views shown in FIGS. 3 and 4) causes the flow control valve 304 to move to the open and closed position, respectively. It is additionally noted that, in the depicted embodiment, a scraper seal 343 (see FIG. 4) is disposed within the actuator main body 332, and wipes particulate or other types of contaminants from the valve operator 346 as it moves into the actuator body inner volume 338.

Because the spring 330 biases the flow control valve 304 toward the closed position, to move it to the open position, some type of motive force should be supplied to overcome this spring bias. In the depicted embodiment, a source of pressurized fluid, such as air, is used to move the piston 340, and thus the flow control valve 304, against the bias of the spring 330. In particular, the actuator main body 332 includes a first fluid actuator port 348 and a second fluid actuator port 350. The first fluid actuator port 348 extends through the actuator main body 332 to the inner volume 338 on the piston first side 342, and the second fluid actuator port 350 extends through the actuator main body 332 to the inner volume 338 on the piston second side 344. The first fluid actuator port 348 is adapted to couple to a pressurized fluid source (not shown in FIGS. 3 and 4), and the second fluid actuator port 350 is a vent that exposes the main body inner volume 338 on the piston second side 344 to the environment surrounding the actuator main body 334.

As was noted above, the spring 330 biases the flow control valve 304 in the closed position. To move it to the open position, a source of pressurized fluid, such as air, is directed into the first fluid actuator port 348. It will be appreciated that the pressure of the fluid should be of a sufficient magnitude to overcome the spring force, and the net pneumatic force acting on the poppet 326. The pressurized fluid entering the actuator inner volume 338 supplies a force on the piston first side 342 sufficient to overcome the spring bias, which moves the flow control valve 304 to the open position. Because the second fluid actuator port 350 vents the actuator inner volume 338 on the piston second side 344 to the environment surrounding the actuator main body 332, this volume is not pressurized and the piston 340 moves substantially freely within the inner volume 338. The flow control valve 304 will remain in the open position so long as the actuator inner volume 338 on the piston first side 342 is sufficiently pressurized. Once the pressure in this actuator inner volume 338 is sufficiently reduced, the spring 330 and net pneumatic force will move the flow control valve 304 to its shut position.

When the valve assembly 226 is mounted in a gas turbine engine 100, as shown in FIG. 2, the fluid inlet port 306 is coupled in fluid communication with the bypass section 116, and the low pressure, intermediate pressure, and high pressure turbine outlet ports 308, 310, 312, are coupled in fluid communication with the low pressure, intermediate pressure, and high pressure manifolds 234, 232, 230, respectively. In addition, the actuator first fluid actuator port 348 is in fluid communication with a remotely operated valve 352 that is in turn in fluid communication with a source of pressurized air (not shown in FIG. 3 or 4). In the depicted embodiment, the remotely operated valve 352 is an energize-to-open solenoid operated valve, though it will be appreciated that other types of valves could be used, and the pressurized air source is the engine high pressure compressor 122, though other sources of pressurized air could also be used. Thus, to open the flow control valve 304, the solenoid valve 352 is energized to fluidly communicate the first fluid actuator port 348 with the engine high pressure compressor 122.

A fraction of the air flowing through the engine bypass section 116 flows into the fluid inlet port 306. If the flow control valve 304 is shut, the air will flow through the fixed flow orifices 320 to supply a flow of cooling air to the turbine case low pressure section 207, via the low pressure turbine manifold 234. If the flow control valve 304 is open, the air entering the fluid inlet port 306 flows through the main flow aperture 318 to supply a flow of cooling air to the turbine case low pressure, intermediate pressure, and high pressure sections 207, 205, 203, via the low pressure, intermediate pressure, and high pressure turbine manifolds, 234, 232, 230, respectively.

In a particular preferred embodiment, when the valve assembly is mounted in the gas turbine engine 100, the flow control valve 304 is selectively moved between the open and closed position in response to command signals from a controller circuit 354. The controller circuit 354 may be any one of numerous controller circuits in an aircraft such as, for example, the controller circuit for the engine 100. The controller circuit 354 is coupled to receive various input signals such as, for example, aircraft altitude 356, various engine temperatures 358, and engine throttle position 360, and, based at least in part on these signals, provides appropriate signals to the solenoid valve 352 to open and close it, to thereby open and close the flow control valve 304.

The particular conditions under which the flow control valve 304 is opened and closed may vary depending on the particular engine design. For example, during some engine operational conditions, only the low pressure turbine section 207 may need to be supplied with a reduced amount cooling air flow. During such conditions, the flow control valve 304 is shut, and cooling air flow is supplied to the low pressure turbine section 207, via the flow orifices 320. Under other engine operational conditions, cooling air flow may need to be supplied to all of the turbine case sections 203, 205, 207. During such conditions, the flow control valve 304 is open, and cooling air flow is supplied to the low pressure, intermediate pressure, and high pressure turbine case sections 207, 205, 203. An exemplary operational control scheme for the exemplary gas turbine engine 100 shown in FIG. 1 will now be described.

During aircraft take-off and climb, the engine throttle is typically placed in its full-throttle position. Under full power conditions, the temperatures within the engine 100, and most notably within the engine turbine section 108, may rise fairly rapidly, resulting in the rapid thermal expansion of the turbine rotor blades 204, 208, 212, 214, 216. Moreover, the centrifugal load on the turbine rotor blades 204, 208, 212, 214, 216 under full power conditions may result in the additional radial growth of these blades. In addition to the thermal expansion and radial growth of the turbine rotor blades 204, 208, 212, 214, 216, the turbine case 202 may also thermally expand.

As was noted above, the flow of cooling air to the turbine case sections 203, 205, 207 is controlled such that the rates of radial expansion of each of the turbine case sections 203, 205, 207 and the turbine rotor blades 204, 208, 212, 214, 216 are substantially matched. As a result, the gaps between the annular seals 224 and the rotor blades 204, 208, 212, 214, 216 can be substantially maintained at an acceptable clearance magnitude.

For the engine 100 shown in FIG. 1, only a small amount of cooling air flow to the low pressure turbine case section 207 is needed during full power conditions to provide an acceptable clearance magnitude between the annular seals 224 and the rotor blades 204, 208, 212, 214, 216. Thus, during full power conditions, the controller circuit 354 does not supply an open command signal to the solenoid valve 352. Consequently, the flow control valve 304 remains in its closed position, and cooling air flow is directed through the flow orifices 320, into and through the low pressure turbine manifold 234, and onto the low pressure turbine case section 207.

Following take-off and aircraft climb operations, full power engine operation is no longer needed, and the engine 100 can be throttled back to a cruise condition. Under these conditions, the temperatures within the turbine section 108 will decrease. As a result, both the turbine rotor blades 204, 208, 212, 214, 216 and the turbine case 202 undergo radial shrinkage. Without controlled cooling of all of the turbine case sections 203, 205, 207, the turbine rotor blade shrinkage would be greater than that of the turbine case sections 203, 205, 207, and the radial gaps between the annular seals 224 the rotor blades 204, 208, 212, 214, 216 would be greater than desirable to maximize turbine efficiency.

Thus, during cruise conditions, the controller circuit 354 supplies an open command signal to the solenoid valve 352. Consequently, the flow control valve 304 moves to the open position, and cooling air flow is directed through the main flow aperture 218, into and through the low pressure, intermediate pressure, and high pressure turbine manifolds 234, 232, 230, and onto the low pressure, intermediate pressure, and high pressure turbine case sections 203, 205, 207.

Figure 5:
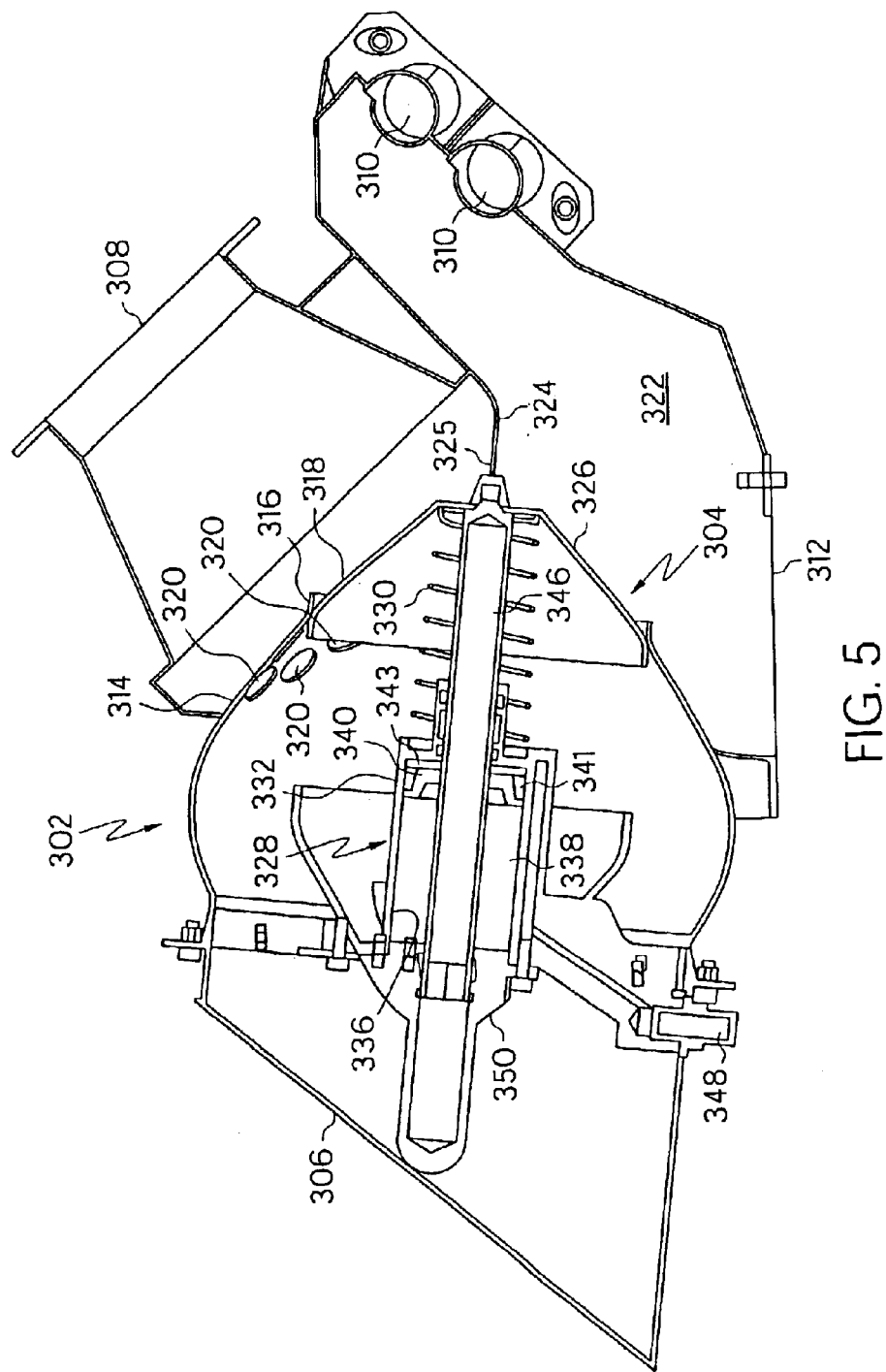
FIGS. 5 and 6 are cross section side and perspective views, respectively, of a physical embodiment of the valve shown in FIGS. 3 and 4.
Figure 6:
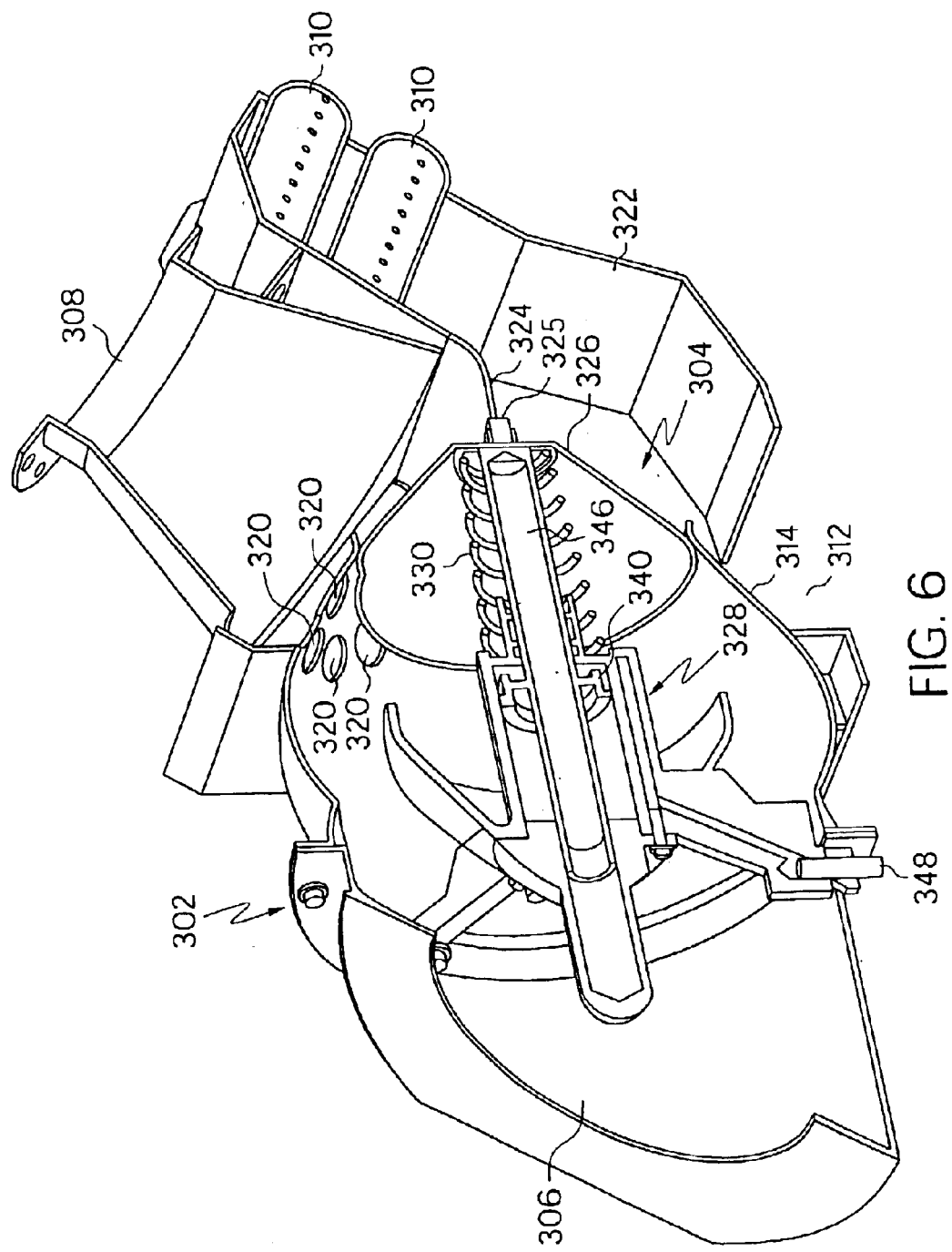

It will be appreciated that the valve assembly 226 may be physically implemented in any one of numerous configurations while simultaneously providing the functionality described above. A physical implementation of a particular preferred embodiment of the valve assembly is shown in FIGS. 5 and 6. It is noted that like reference numerals in FIGS. 5 and 6 refer to like components depicted in FIGS. 3 and 4, and that were described above.

The valve assembly 226 shown in FIGS. 5 and 6 is preferably constructed of lightweight, yet durable materials. For example, the valve body 302 and poppet 326 are both constructed of sheet metal, though it will be appreciated that other lightweight materials could also be used. In addition, the actuator main body 332 is constructed of aluminum, or other lightweight material, and the actuator seal 341, the wiper sea 343, and the inner bearing surface 336, are preferably constructed of polymer, though other materials may also be used.

The valve assembly 226 described herein is relatively lightweight and less complex, as compared to presently known valve systems used to selectively supply cooling air flow to engine turbine cases. These features generally increase valve assembly reliability, while reducing engine and system costs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A turbofan jet engine, comprising:
   a turbine case including at least a high pressure turbine section and a low pressure turbine section;
   a fan case disposed around at least a portion of the turbine case and spaced apart therefrom to form a bypass flow passage; and
   a valve assembly mounted in the engine, the valve assembly including:
      a valve body having at least a fluid inlet port in fluid communication with the bypass flow passage, a first fluid outlet port in fluid communication with the low pressure turbine case section, and a second fluid outlet port in fluid communication with the high pressure turbine case section, and
      a valve disposed in the valve body and selectively moveable between (i) a closed position, in which only the first fluid outlet port is in substantial fluid communication with the fluid inlet port to thereby supply cooling air to the low pressure turbine case section, and (ii) an open position, in which the first fluid outlet port and the second fluid outlet port are both in substantial fluid communication with the fluid inlet port to thereby supply cooling air to the low pressure turbine case section and the high pressure turbine case section.

2. The engine of claim 1, wherein:
   the turbine case further includes an intermediate pressure turbine section;
   the valve body further includes a third fluid outlet port in fluid communication with the intermediate pressure turbine section; and
   the first, second, and third fluid outlet ports are in substantial flow communication with the fluid inlet port when the valve is in the open position.

3. The engine of claim 1, wherein the valve assembly further comprises:
   a flow control wall disposed within the valve body between the fluid inlet port and the first and second fluid outlet ports;
   a valve seat surface formed on the flow control wall against which the valve seats when in the closed position, the valve seat surface defining a main flow passage through the flow control wall that is in fluid communication with the first and second outlet ports; and
   one or more flow orifices extending through the flow control wall and disposed to substantially fluidly communicate the fluid inlet and the first fluid outlet with one another.

4. The engine of claim 3, wherein the valve assembly further comprises:
   a flow isolation baffle disposed within the valve body between the first fluid outlet port and the second fluid outlet port, the flow isolation baffle including a valve restriction surface,
   wherein the valve moves at least proximate the valve restriction surface when in the closed position, thereby substantially isolating the first fluid outlet port from the second fluid outlet port.

5. The engine of claim 1, wherein the valve assembly further comprises:
   an actuator mounted within the valve body and coupled to the valve, the actuator operable to selectively move the valve between the open and closed positions.

6. The engine of claim 5, wherein the actuator comprises:
   a main body having an inner surface that defines an inner volume;
   a piston movably mounted within the main body inner volume and coupled to the valve.

7. The engine of claim 1, wherein the valve assembly further comprises:
   a first fluid actuator port extending through the actuator main body at a location on one side of the piston, the first fluid actuator port adapted to couple to a pressurized fluid source; and
   a second fluid actuator port extending through the actuator main body at a location on another side of the piston.

8. The engine of claim 1, further comprising:
   a control valve having at least an inlet and an outlet, the inlet coupled to a source of pressurized air and the outlet coupled to the first fluid actuator port.

9. The engine of claim 1, further comprising:
   a controller circuit coupled to receive one or more signals representative of engine operating conditions and operable, in response thereto, to supply one or more command signals to the control valve, wherein the control valve is coupled to receive the command signals from the controller circuit and, in response thereto, move to the open or closed position.

10. The engine of claim 9, wherein the pressurized air source is coupled to the first fluid actuator port when the control valve is open.

11. The engine of claim 1, wherein the valve assembly further comprises:
a spring configured to bias the valve to the closed position.

12. A valve assembly for selectively distributing cooling air flow to multiple sections of a turbofan jet engine turbine case, the valve assembly comprising:
a valve body adapted to mount in a bypass section of the turbofan jet engine, the body having at least a fluid inlet port, a first fluid outlet port, and a second fluid outlet port;
a flow control wall disposed within the valve body between the fluid inlet port and the first and second fluid outlet ports;
a valve seat surface formed on the flow control wall, the valve seat surface defining a main flow passage through the flow control wall that is in fluid communication with the first and second fluid outlet ports;
one or more flow orifices extending through the flow control wall and disposed to substantially fluidly communicate the fluid inlet and the first fluid outlet with one another; and
a valve disposed in the valve body and selectively moveable between (i) a closed position, in which only the first fluid outlet port is in substantial fluid communication with the fluid inlet port, and (ii) an open position, in which the first fluid outlet port and the second fluid outlet port are both in substantial fluid communication with the fluid inlet port.

13. The valve assembly of claim 12, wherein:
the valve body further includes a third fluid outlet port; and
the first, second, and third fluid outlet ports are in substantial fluid communication with the fluid inlet port when the valve is in the open position.

14. The valve assembly of claim 13, further comprising:
a flow isolation baffle disposed within the valve body between the first fluid outlet port and the second fluid outlet port, the flow isolation baffle including a valve restriction surface,
wherein the valve is at least proximate the valve restriction surface when in the closed position, thereby substantially isolating the first fluid outlet port from the second fluid outlet port.

15. The valve assembly of claim 12, further comprising:
an actuator mounted within the valve body and coupled to the valve, the actuator operable to selectively move the valve between the open and closed positions.

16. The valve assembly of claim 12, wherein the actuator comprises:
a main body having an inner bearing surface that defines an inner volume;
a piston movably mounted within the main body inner volume against the inner bearing surface, the piston coupled to the valve.

17. The valve assembly of claim 16, further comprising:
a first fluid actuator port extending through the actuator main body at a location on one side of the piston, the first fluid actuator port adapted to couple to a pressurized fluid source; and a second fluid actuator port extending through the actuator main body at a location on another side of the piston.

18. The valve assembly of claim 16, further comprising:
a valve operator shaft coupled between the piston and the valve, whereby movement of the piston causes like movement of the shaft and valve.

19. The valve assembly of claim 17, further comprising:
a shaft opening extending through the actuator main body through which the valve operator shaft extends; and
a seal disposed in the actuator main body proximate the shaft opening, the seal in contact with the valve operator shaft to thereby wipe portions of the shaft as it enter and exits the actuator main body.

20. The valve assembly of claim 15, further comprising:
a spring coupled between the actuator and the valve and configured to bias the valve to the closed position.

21. A valve assembly for selectively distributing cooling air flow to multiple sections of a turbofan jet engine turbine case, the valve assembly comprising:
a valve body adapted to mount in a bypass section of the turbofan jet engine, the body having at least a fluid inlet port, a first fluid outlet port, a second fluid outlet port, and a third fluid outlet port;
a valve disposed in the valve body and selectively moveable between (i) a closed position, in which only the first fluid outlet port is in substantial fluid communication with the fluid inlet port, and (ii) an open position, in which the first, second, and third fluid outlet ports are in substantial fluid communication with the fluid inlet port; and
an actuator mounted within the valve body and coupled to the valve, the actuator operable to selectively move the valve between the open and closed positions.

22. The valve assembly of claim 21, further comprising:
a flow control wall disposed within the valve body between the fluid inlet port and the first fluid outlet port and the second and third fluid outlet ports;
a valve seat surface formed on the flow control wall against which the valve seats when in the closed position, the valve seat surface defining a main flow passage through the flow control wall that is in fluid communication with the first, second, and third fluid outlet ports; and
one or more flow orifices extending through the flow control wall and disposed to substantially fluidly communicate the fluid inlet and the first fluid outlet with one another.

23. The valve assembly of claim 22, further comprising:
a flow isolation baffle disposed within the valve body between the first fluid outlet port and the second and third fluid outlet ports, the flow isolation baffle including a valve restriction surface,
wherein the valve is at least proximate the valve restriction surface when in the closed position, thereby substantially isolating the first fluid outlet port from the second and third fluid outlet ports.

24. The valve assembly of claim 22, wherein the actuator comprises:
a main body having an inner bearing surface that defines an inner volume;
a piston movably mounted within the main body inner volume against the inner bearing surface, the piston coupled to the valve.

25. The valve assembly of claim 24, further comprising:
a first fluid actuator port extending through the actuator main body at a location on one side of the piston, the first fluid actuator port adapted to couple to a pressurized fluid source; and a second fluid actuator port extending through the actuator main body at a location on another side of the piston.

26. The valve assembly of claim 24, further comprising:

a valve operator shaft coupled between the piston and the valve, whereby movement of the piston causes like movement of the shaft and valve.

27. The valve assembly of claim 26, further comprising:

a shaft opening extending through the actuator main body through which the valve operator shaft extends; and a seal disposed in the actuator main body proximate the shaft opening, the seal in contact with the valve operator shaft to thereby wipe portions of the shaft as it enter and exits the actuator main body.

28. The valve assembly of claim 21, further comprising:

a spring coupled between the actuator and the valve and configured to bias the valve to the closed position.

29. A valve actuator for moving a turbine case cooling valve between an open and a closed position, the actuator comprising:

a main body adapted to mount within the turbine case cooling valve, the main body including an inner bearing surface that defines an inner volume;

a piston movably mounted within the main body inner volume against the inner bearing surface, the piston adapted to couple to the turbine case cooling valves;

a first fluid actuator port extending through the main body at a location on one side of the piston, the first fluid actuator port adapted to couple to a pressurized fluid source; and a second fluid actuator port extending through the main body at a location on another side of the piston.

30. The valve actuator of claim 29, further comprising:

a valve operator shaft having at least a first section coupled to the piston and a second section adapted to couple to the turbine case cooling valve.

31. The valve actuator of claim 30, further comprising:

a shaft opening extending through the main body through which the valve operator shaft extends; and a seal disposed in the resin body proximate the shaft opening, the seal in contact with the valve operator shaft to thereby wipe portions of the shaft as it enter and exits the main body.

* * * * *